(12) United States Patent
Tanabe et al.

(10) Patent No.: US 12,147,770 B2
(45) Date of Patent: Nov. 19, 2024

(54) INFORMATION PROCESSING DEVICE, READING COMPREHENSION SUPPORT METHOD, AND PROGRAM

(71) Applicant: SHOWA DENKO K.K., Tokyo (JP)

(72) Inventors: Chinatsu Tanabe, Tokyo (JP); Hiroko Takashi, Tokyo (JP); Nao Takeuchi, Tokyo (JP); Eriko Takeda, Tokyo (JP); Kenichiro Nakajima, Tokyo (JP); Tomoko Miyashita, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 325 days.

(21) Appl. No.: 17/757,375

(22) PCT Filed: Dec. 17, 2020

(86) PCT No.: PCT/JP2020/047078
§ 371 (c)(1),
(2) Date: Jun. 15, 2022

(87) PCT Pub. No.: WO2021/125252
PCT Pub. Date: Jun. 24, 2021

(65) Prior Publication Data
US 2023/0334252 A1   Oct. 19, 2023

(30) Foreign Application Priority Data

Dec. 20, 2019 (JP) .................. 2019-230888
Dec. 20, 2019 (JP) .................. 2019-230889
Dec. 20, 2019 (JP) .................. 2019-230890

(51) Int. Cl.
*G06F 40/30*   (2020.01)
*G06F 40/106*  (2020.01)
(Continued)

(52) U.S. Cl.
CPC ............ *G06F 40/30* (2020.01); *G06F 40/106* (2020.01); *G06F 40/109* (2020.01); *G06F 40/279* (2020.01); *G06Q 50/184* (2013.01)

(58) Field of Classification Search
CPC ........ G06F 40/30; G06F 40/10; G06F 40/103; G06F 40/106; G06F 40/117;
(Continued)

(56) References Cited

U.S. PATENT DOCUMENTS

2005/0108652 A1   5/2005   Beretich, Jr. et al.
2005/0261891 A1   11/2005  Chan et al.
(Continued)

FOREIGN PATENT DOCUMENTS

JP    3682535        8/2005
JP    2006-260597    9/2006
(Continued)

OTHER PUBLICATIONS

International Search Report for PCT/JP2020/047078 mailed on Mar. 9, 2021.

*Primary Examiner* — Qi Han
(74) *Attorney, Agent, or Firm* — IPUSA, PLLC

(57) ABSTRACT

An information processing device includes an analyzing unit configured to analyze text data representing claims included in patent document data to identify constituent components of an invention for each claim included in the claims, and a display control unit configured to cause a display device to display texts indicating each claim in the claims, in a form in which the texts indicating each claim are partitioned into the constituent components.

15 Claims, 8 Drawing Sheets

(51) Int. Cl.
*G06F 40/109* (2020.01)
*G06F 40/279* (2020.01)
*G06Q 50/18* (2012.01)

(58) Field of Classification Search
CPC ........ G06F 40/137; G06F 40/14; G06F 40/16;
G06F 40/186; G06F 40/20; G06F 40/205;
G06F 40/211; G06F 40/253
USPC .................................. 704/1, 9, 2, 4, 10, 257
See application file for complete search history.

(56) References Cited

U.S. PATENT DOCUMENTS

| | | | |
|---|---|---|---|
| 2006/0173903 A1* | 8/2006 | Zimmerman | G06Q 10/10 707/999.102 |
| 2008/0281860 A1 | 11/2008 | Elias et al. | |
| 2009/0070317 A1* | 3/2009 | Cooper | G06Q 10/10 707/999.005 |
| 2013/0042170 A1* | 2/2013 | Milton, Jr | G06Q 10/10 715/225 |
| 2019/0258687 A1* | 8/2019 | Spangenberg | G06F 16/24578 |
| 2020/0193153 A1* | 6/2020 | Lee | G06F 40/226 |

FOREIGN PATENT DOCUMENTS

| | | |
|---|---|---|
| JP | 2007-065745 | 3/2007 |
| JP | 2012-003517 | 1/2012 |
| JP | 2014-219833 | 11/2014 |

\* cited by examiner

FIG.5

SELECTED PATENT COLLECTION C

List number: 23 / 38 [Previous] [Next]

| Item 22 | Patent xxxxxx — ELECTROLYTE FILM AND ELECTROLYTE ... |
| Item 23 | Patent xxxxxx — CURRENT COLLECTOR FOR POWER STORAGE DEVICE ... |
| Item 24 | Patent xxxxxx — CATHODE INCLUDING METALLIC NANOPARTICLE ... |
| Item 25 | Patent xxxxxx — DYE-SENSITIZED SOLAR CELL ... |
| Item 26 | Patent xxxxxx — METHOD OF MANUFACTURING COMPOSITE MATERIAL |
| Item 27 | Patent xxxxxx — CATALYST LAYER, MEMBRANE ELECTRODE ASSEMBLY ... |
| Item 28 | Patent xxxxxx — ELECTRODE CATALYST LAYER, MEMBRANE ELECTRODE ASSEMBLY ... |

1022

APPLICANT: XX CORPORATION ○○○○○  TITLE: CURRENT COLLECTOR FOR POWER STORAGE DEVICE AND COATING SOLUTION USED TO MANUFACTURE THE SAME

Claims | All claims: 4 / Independent claims: 2 | Display all claims | 📎 On/Off | ⚙ Text | ∨Small | Large∧ | Legend ⌄

[Claim 1] A current collector for a power storage device in which covering layer is formed ............................................ is formed,
A current collector for a power storage device in which .......................................................................................
wherein the covering layer includes a powdery carbon material, acid denatured ............. in the covering layer,
wherein ...........................................................................
wherein in the covering layer.

[Claim 2] The current collector for the power storage device [1]
The current collector for the power storage device as claimed in claim 1, wherein the conductive base material is metal.

[Claim 3] The current collector for the power storage device [1, 2]
The current collector for the power storage device as claimed in claim 1 or 2, wherein the conductive base material is ..............................................

[Claim 4] A coating solution for manufacturing a current collector for a power storage device
A coating solution comprising a powdery carbon material ....................................................................
wherein a content rate of ............................................................................ in the coating solution is from 2 mass% to 20 mass%,
wherein a content rate of the powdery carbon material and the acid denatured ................. is from 20:80 to 40:60.
wherein the powdery carbon material and the acid denatured .................................................
wherein the solvent includes ...........................................................................

1023

Evaluation

Body text — Display body text 1024 1025 1026

INFORMATION PROCESSING DEVICE, READING COMPREHENSION SUPPORT METHOD, AND PROGRAM

TECHNICAL FIELD

The present invention relates to an information processing device, a reading comprehension support method, and a program.

BACKGROUND ART

Conventionally, techniques for assisting the reading comprehension of patent documents have been developed. In particular, the description of claims included in patent documents is often more difficult than that of general documents. Thus, techniques for assisting the reading comprehension of the patent documents, in particular, the claims, have been studied.

For example, Patent Document 1 discloses a device that outputs a view indicating a relationship between an element represented by a character string specified from the description of the claims and an element at a lower level from the element. Additionally, Patent Document 2 discloses a device that generates information in which the description of the claims is partitioned by phrases and a relationship between multiple partitioned description fragments is structured.

RELATED ART DOCUMENT

Patent Documents

[Patent Document 1] Japanese Laid-open Patent Application Publication No. 2014-219833
[Patent Document 2] Japanese Laid-open Patent Application Publication No. 2012-003517

SUMMARY OF THE INVENTION

Problem to be Solved by the Invention

An task of reading and comprehending patent documents is being performed for the purpose of various tasks such as a survey and research. During such work, it is often necessary to read a large number of patent documents, and it is important to read the claims quickly and accurately.

However, in the technique disclosed in Patent Document 1 or Patent Document 2, the claims cannot be understood at a glance when reading and comprehending a large number of patent documents, and quickness in the reading comprehension is lacking.

The invention disclosed in Patent Document 1 assists the reading comprehension by partitioning the description of the claims into multiple elements according to a set rule, performing structural analysis on the description of the claims by extracting a relationship between the partitioned elements, receiving a specification of a character string included in the description of the claims, extracting structural information corresponding to the specified character string from structural information of the document that is obtained by the structural analysis, and schematically outputting the extracted structural information.

The invention disclosed in Patent Document 2 is a claim structural information generating device that generates claim structural information indicating description fragments obtained by partitioning text of a claim and a structure of the description fragments, and includes a storage unit that stores claim information, which is texts of the claims, a morphological analysis unit that performs morphological analysis on the claim information, a phrase identifying unit that identifies partitioned positions of phrases of the claim information, a superficial partition information storage unit that stores two or more of superficial partition information including superficial lead information that is a delimiter of the description fragments and that indicates a relationship between the description fragments and a token corresponding to the superficial lead information, a token providing unit that provides the token corresponding to the superficial lead information at a position corresponding to the superficial lead information in the claim information, a phrase type correspondence information storage unit that stores two or more of phrase type correspondence information including the lead information about a part of speech of a phrase that is the delimiter of the description fragments and a partition phrase type corresponding to the lead information about the part of speech, a partition phrase type providing unit that provides, to a phrase corresponding to the lead information of the part of speech in the claim information, a partition phrase type corresponding to the lead information of the part of speech, a generating unit that generates claim structural information indicating a structure of the description fragments of the claim information in accordance with a predetermined rule expressing a claim structure by using the token and the partition phrase type provided in the claim information, an output unit that outputs the claim structural information generated by the generating unit, so that the claim structural information generating device performs structural analysis on the claims having deeper structure.

As described, although the technique disclosed in Patent Document 1 or Patent Document 2 is suitable for the purpose of attaining deeply reading comprehension of the disclosure of one patent document, it is not suitable for the purpose of reading comprehension of the description of the patent claims sufficiently quickly and accurately when it is necessary to read and comprehend a large number of patent documents because the purpose is not specialized in improving the readability of the description of the claims.

The present invention is made in view of the above-described circumstance, and it is an object to assist quick and accurate reading comprehension of the claims.

Means for Solving the Problem

The present invention includes the following configurations.

[1] An information processing device includes an analyzing unit configured to analyze text data representing claims included in patent document data to identify constituent components of an invention for each claim included in the claims, and a display control unit configured to cause a display device to display texts indicating each claim in the claims, in a form in which the texts indicating each claim are partitioned into the constituent components.

[2] In the information processing device as described in [1], the analyzing unit further identifies an important word in the text data representing the claims, the important word indicating an important term, and the display control unit causes the display device to highlight a text indicating the important word in the texts indicating each claim in the claims.

[3] In the information processing device as described in [1] or [2], the analyzing unit further analyzes text data representing a specification included in the patent document data to identify a new word indicating a term used to describe the invention in the specification, no antecedent description of the term being included in the claims, and the display control unit causes the display device to highlight a text indicating the new word in the texts indicating each claim in the claims.

[4] The information processing device as described in any one of [1] to [3], further includes an input receiving unit configured to receive an input of an evaluation result of a user with respect to the patent document data, and an evaluation registering unit configured to register the evaluation result in association with the patent document data. The display control unit causes the display device to display the evaluation result.

[5] In the information processing device as described in [4], the display control unit causes devices used by a plurality of users to display the patent document data analyzed by the analyzing unit and the evaluation result registered by the evaluation registering unit.

[6] In the information processing device as described in any one of [1] to [5], the display control unit causes the partitioned constituent components to be schematically displayed as a structural drawing.

[7] A reading comprehension support method includes analyzing text data representing claims included in patent document data to identify constituent components of an invention for each claim included in the claims, and displaying texts indicating each claim in the claims, in a form in which the texts indicating each claim are partitioned into the constituent components.

[8] A program causes a computer to perform a step of analyzing text data representing claims included in patent document data to identify constituent components of an invention for each claim included in the claims, and a step of causing a display device to display texts indicating each claim in the claims, in a form in which the texts indicating each claim are partitioned into the constituent components.

[9] An information processing device includes an analyzing unit configured to analyze text data representing claims included in patent document data to identify subject matter of an invention for each claim included in the claims, and a display control unit configured to cause a display device to display a text indicating the subject matter in association with a number of the claim.

[10] In the information processing device as described in [9], the analyzing unit further identifies constituent components of the invention for each claim included in the claims, and the display control unit further causes the display device to display texts indicating each claim in the claims, in a form in which the texts indicating each claim are partitioned into the constituent components.

[11] In the information processing device as described in [9] or [10], the display control unit causes the display device to switch between displaying a screen that includes the texts indicating each claim of the claims and a screen that does not include the texts indicating each claim of the claims, in accordance with an operation of a user.

[12] The information processing device as described in any one of [9] to [11], further includes an input receiving unit configured to receive an input of an evaluation result of a user with respect to the patent document data, and an evaluation registering unit configured to register the evaluation result in association with the patent document data. The display control unit causes the display device to display the evaluation result.

[13] In the information processing device as described in [12], the display control unit causes devices used by a plurality of users to display the patent document data analyzed by the analyzing unit and the evaluation result registered by the evaluation registering unit.

[14] In the information processing device as described in any one of [9] to [13], the analyzing unit selects the text indicating the subject matter in the text data representing the claim.

[15] In the information processing device as described in any one of [9] to [13], the analyzing unit selects a phrase that unambiguously indicates the invention and that has a length in which a user can easily identify the invention, in the text data representing the claim, as the text indicating the subject matter.

[16] A reading comprehension support method includes analyzing text data representing claims included in patent document data to identify subject matter of an invention for each claim included in the claims, and displaying a text indicating the subject matter in association with a number of the claim.

[17] A program causes a computer to perform a step of analyzing text data representing claims included in patent document data to identify subject matter of an invention for each claim included in the claims, and a step of causing a display device to display a text indicating the subject matter in association with a number of the claim.

[18] An information processing device includes an analyzing unit configured to analyze text data representing claims included in patent document data to identify a dependent relationship of the claim included in the claims, and a display control unit configured to causes a display device to display a text indicating an independent claim included in the claims based on the identified dependent relationship.

[19] In the information processing device as described in [18], the analyzing unit identifies subject matter of an invention for each claim included in the claims, and the display control unit causes the display device to display a text indicating the subject matter in association with a number of the claim.

[20] In the information processing device as described in [18] or [19], the analyzing unit further identifies constituent components of the invention for each claim included in the claims, and the display control unit further causes the display device to display texts indicating each claim in the claims, in a form in which the texts indicating each claim are partitioned into the constituent components.

[21] In the information processing device as described in [19], the analyzing unit further identifies constituent components of the invention for each claim included in the claims, and the display control unit causes, based on the identified dependent relationship, a display device to display the texts indicating each claim in the claims in a form in which the texts indicating each claim are partitioned into the constituent components with respect to an independent claim, and to display the text indicating the subject matter in association with the number of the claim and display the texts indicating each claim in the claims in a selected division display format with respect to a dependent claim, a division display format in which the texts indicating each claim in the claims that are partitioned into the constituent components are displayed or a division display format in which the texts indicating each claim in the claims is not displayed is selected as the selected division display format.

[22] The information processing device as described in any one of [18] to [21], further includes an input receiving unit configured to receive an input of an evaluation result of a user with respect to the patent document data, and an evaluation registering unit configured to register the evaluation result in association with the patent document data. The display control unit causes the display device to display the evaluation result.

[23] In the information processing device as described in [22], the display control unit causes devices used by a plurality of users to display the patent document data analyzed by the analyzing unit and the evaluation result registered by the evaluation registering unit.

[24] In the information processing device as described in any one of [18] to [23], the analyzing unit classifies a claim whose dependent relationship is unclear into an independent claim in a process of identifying the dependent relationship.

[25] A reading comprehension support method includes analyzing text data representing claims included in patent document data to identify a dependent relation of each claim included in the claims, and displaying a text indicating an independent claim included in the claims based on the identified dependent relation.

[26] A program causes a computer to perform a step of analyzing text data representing claims included in patent document data to identify a dependent relation of each claim included in the claims and a step of causing a display device to display a text indicating an independent claim included in the claims based on the identified dependent relation.

Effect of the Invention

Quick and accurate reading comprehension of the claims can be assisted.

BRIEF DESCRIPTION OF THE DRAWINGS

FIG. 5 is a view illustrating an example of an analysis result screen according to one embodiment.

FIG. 7 is a view illustrating yet another example of the analysis result screen according to one embodiment.

Figure 8:
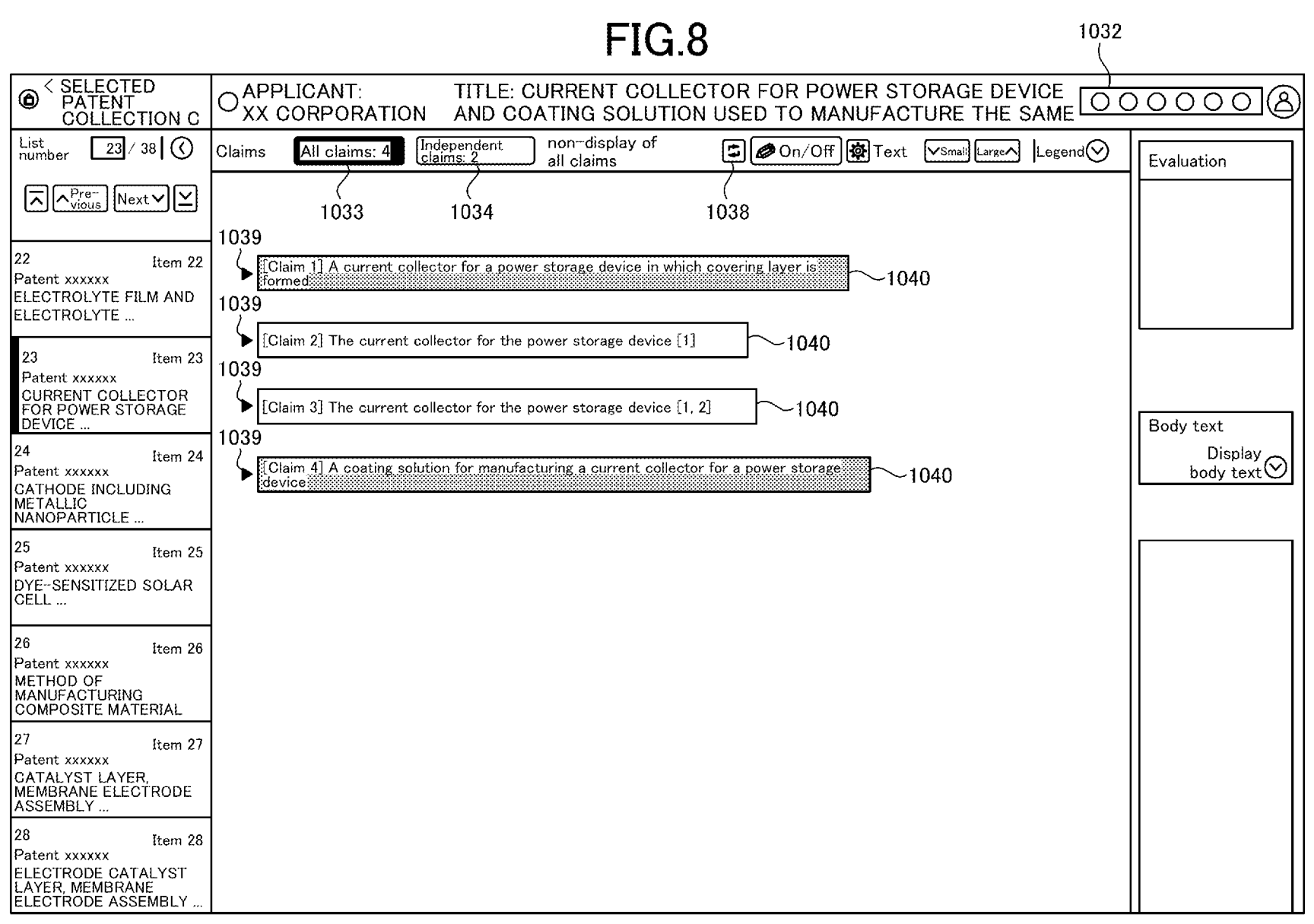

FIG. 8 is a view illustrating yet another example of the analysis result screen according to one embodiment.

EMBODIMENT FOR CARRYING OUT THE INVENTION

In the following, an embodiment of a reading comprehension support system according to the present invention will be described with reference to the drawings.

Figure 1:
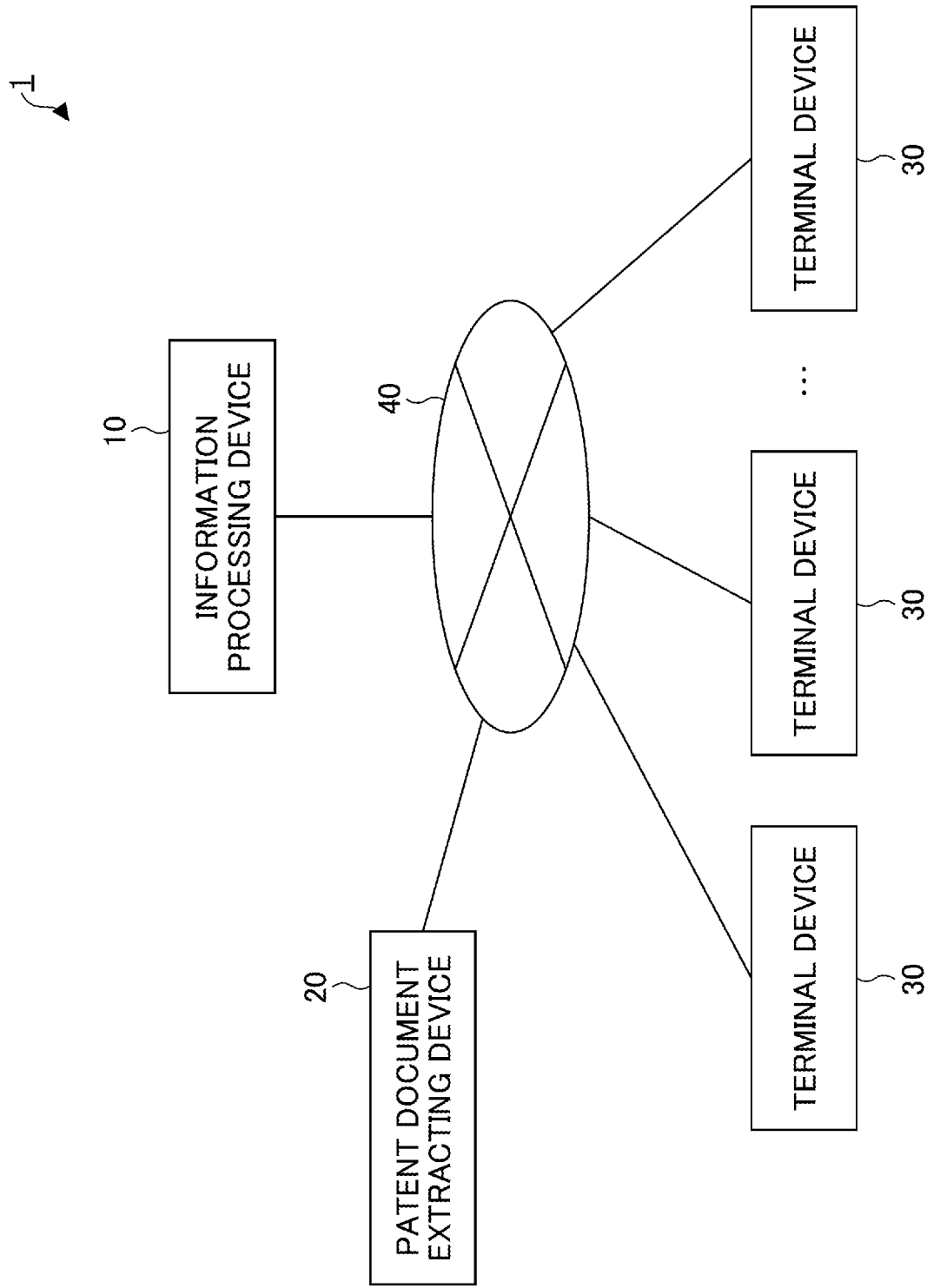
FIG. 1 is a diagram illustrating an example of a system configuration of a reading comprehension support system according to one embodiment.

FIG. 1 is a diagram illustrating an example of a system configuration of the reading comprehension support system according to one embodiment.

A reading comprehension support system 1 is a system that assists reading comprehension of patent documents. Specifically, the reading comprehension support system 1 includes an information processing device 10, a patent document extracting device 20, and a terminal device 30.

The information processing device 10, the patent document extracting device 20, and the terminal device 30 are communicably connected to each other via a network 40.

The information processing device 10 analyzes data representing patent documents (hereinafter, patent document data) and generates screen data displayed on a screen based on an analysis result. The generated screen data is data indicating a screen in which the description of the claims included in the patent document data is easily comprehensible.

The patent document extracting device 20 extracts, upon receiving a specification of a search condition given by a user operation via the terminal device 30, the patent document data from a database, such as patent publications and published patent applications, based on the search condition. The patent document extracting device 20 transmits the extracted patent document data to the information processing device 10 in accordance with the user operation via the terminal device 30.

The terminal device 30 is a device that instructs the information processing device 10 or the patent document extracting device 20 to perform various functions in response to receiving the user's operation, and displays, in response to receiving screen data from the information processing device 10 or the patent document extracting device 20, the received screen data.

Next, a hardware configuration of the information processing device 10 will be described.

Figure 2:
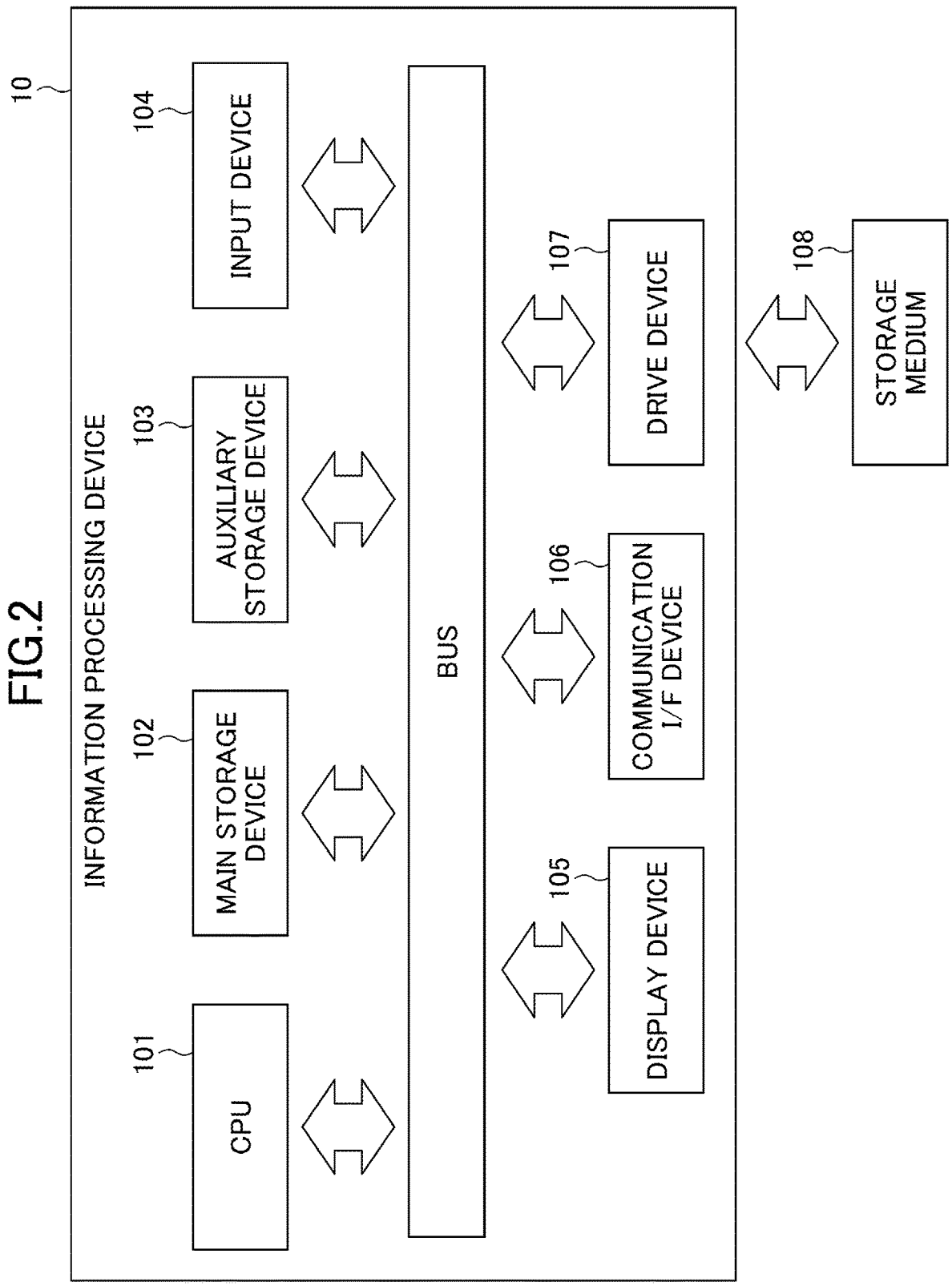
FIG. 2 is a diagram illustrating an example of a hardware configuration of an information processing device according to one embodiment.

FIG. 2 is a diagram illustrating an example of the hardware configuration of the information processing device according to one embodiment.

The information processing device 10 includes a central processing unit (CPU) 101, a main storage device 102, an auxiliary storage device 103, an input device 104, a display device 105, a communication interface device 106, and a drive device 107. Each of these devices is connected via a bus.

The CPU 101 is a main controller that controls an operation of the information processing device 10. The CPU 101 achieves various functions described below by reading and executing a program stored in the main storage device 102.

At the start of the information processing device 10, the main storage device 102 reads the program from the auxiliary storage device 103 and stores the program. The auxiliary storage device 103 stores the installed program and stores files, data, and the like required for various functions described below.

The input device 104 is a device for inputting various information and is implemented by, for example, a keyboard, a pointing device, or the like. The display device 105 is used to display various information and is implemented by, for example, a display or the like. The communication interface device 106 includes a LAN card or the like and is used to connect to a network.

The program according to the present embodiment is at least a part of various programs that controls the information processing device 10. The programs are provided, for example, by distribution of a storage medium 108, by downloading from a network, or the like. For the storage medium 108 recording the program, various types of storage media, such as a storage medium recording information optically, electrically, or magnetically such as a CD-ROM, a flexible disk, a magneto-optical disk, or the like, and a semiconductor memory recording information electrically, such as a ROM, a flash memory, or the like may be used.

Additionally, when the storage medium 108 storing the program is set in the drive device 107, the program is installed in the auxiliary storage device 103 from the storage medium 108 via the drive device 107. The program downloaded from the network is installed in the auxiliary storage device 103 via the communication interface device 106.

Next, a function of the information processing device 10 will be described.

Figure 3:
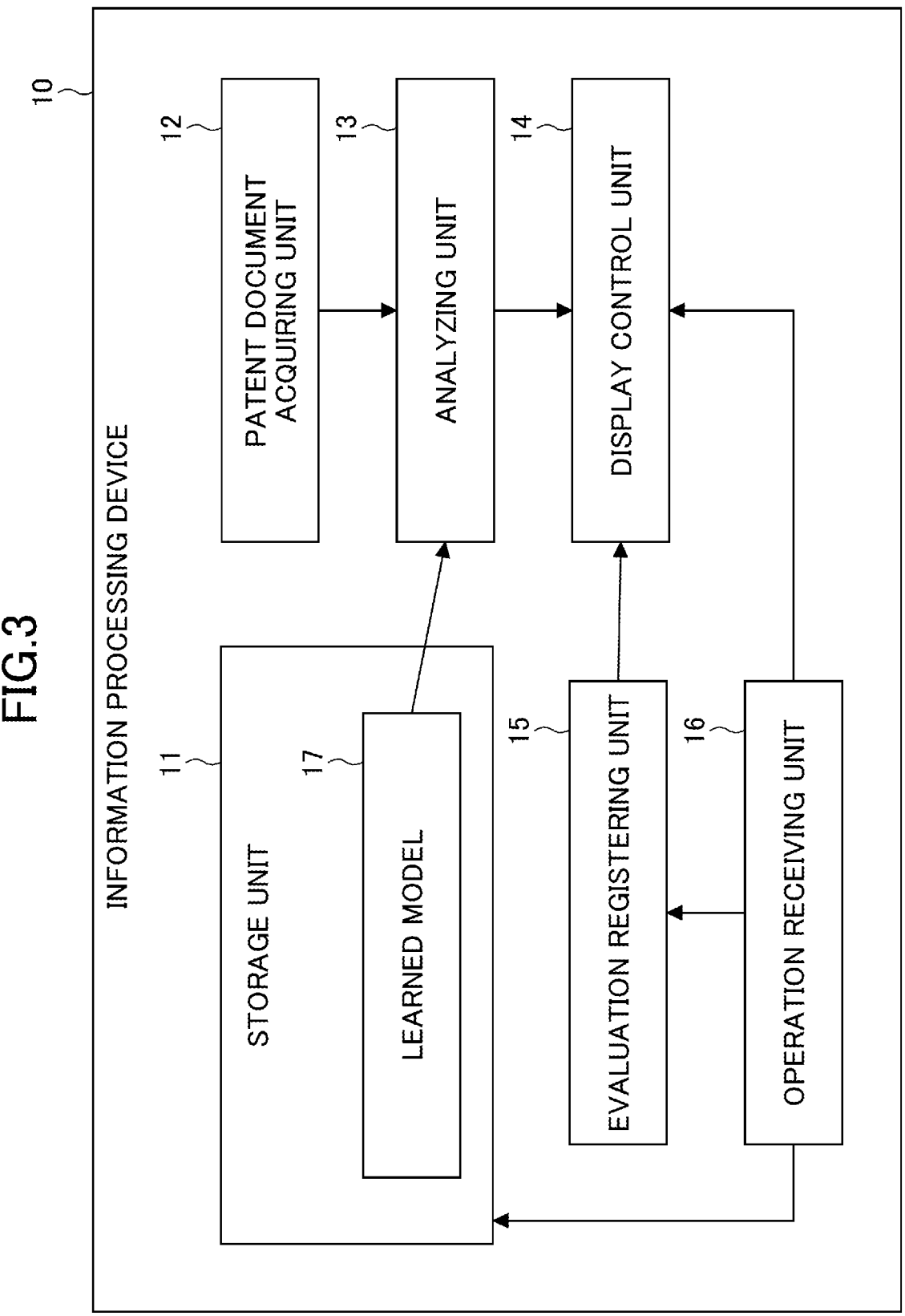
FIG. 3 is a diagram illustrating an example of a function of the information processing device according to one embodiment.

FIG. 3 is a diagram illustrating an example of the function of the information processing device according to one embodiment.

The information processing device 10 includes a storage unit 11, a patent document acquiring unit 12, an analyzing unit 13, a display control unit 14, an evaluation registering unit 15, and an operation receiving unit 16.

The storage unit 11 stores various data, programs, and the like. Specifically, the storage unit 11 stores a learned model 17.

The learned model 17 is a model constructed by machine learning for analysis of the patent documents. The learned model 17 may be, for example, a neural network, a decision tree, a support vector machine, or the like, and may be a model constructed by deep learning. Specifically, the learned model 17 is preferably specialized for linguistic analysis and may be, for example, "IBM WATSON (registered trademark)". The "IBM WATSON" used as the learned model 17 may be customized for the analysis of patent documents.

Here, the machine learning is a technique in which a computer autonomously generates an algorithm from training data in order to efficiently perform a particular task depending on patterns and inference. The learned model 17 according to the present embodiment is a model indicating an algorithm generated in this manner.

The patent document acquiring unit 12 acquires patent document data. Specifically, the patent document acquiring unit 12 receives the patent document data extracted in the patent document extracting device 20. The data to be transmitted is data indicating a collection of one or more patent documents (hereinafter referred to as collection data). The collection data may be, for example, a file in a CSV (comma-separated values) format or the like. The collection data is an example of the patent document data.

The analyzing unit 13 analyzes the collection data. Specifically, the analyzing unit 13 applies the algorithm indicated in the learned model 17 and analyzes each patent document included in the collection data.

The analyzing unit 13 identifies constituent components of the invention based on the description of the claims included in each patent document. The analyzing unit 13 partitions the description of each claim into the constituent components.

Here, the constituent components are elements defining the invention and are features necessary for an object to be included in the scope of the invention. Specifically, in the case of an invention of a product, the constituent components may include elements such as parts provided in the product, but are not limited thereto. For example, the analyzing unit 13 may partition the same parts included in the product into multiple constituent components.

Generally, in order to grasp the scope of the invention for each claim, the description of each claim is partitioned into the constituent components and examined. Additionally, it is known that it is difficult to grasp the scope of the invention if the description of each constituent component partitioned in such a way is too long or too short.

Therefore, it is desirable that the learned model 17 is constructed as an algorithm that partitions each claim into constituent components having a length for easy reading comprehension by performing machine learning in advance. Then, according to the algorithm defined in the learned model 17 constructed in such a way, the analyzing unit 13 outputs text data in which the description of each claim is partitioned into the constituent components having a length for easy reading comprehension by using the text data representing each claim as an input.

Additionally, the analyzing unit 13 determines a text indicating the subject matter of the invention for each claim. Specifically, the learned model 17 is constructed as an algorithm that extracts the subject matter of the invention from the text data of each claim by performing machine learning in advance. Then, according to the algorithm defined in the learned model 17 constructed in such a way, the analyzing unit 13 outputs text data representing the subject matter of the invention of each claim by using the text data representing each claim as input.

Furthermore, the analyzing unit 13 classifies each claim into an independent form claim and a dependent form claim. The independent form claim (hereinafter referred to as the independent claim) is a claim described independently of other claims, and the dependent form claim (hereinafter referred to as the dependent claim) is a claim described by referring to another claim. Specifically, the learned model 17 is constructed as an algorithm that determines a dependent relationship of claims included in the claims based on text data representing the claims by performing machine learning in advance. Then, according to the algorithm defined in the learned model 17 constructed in such a way, the analyzing unit 13 outputs data in which respective claims are classified into the independent claim and the dependent claim by using the text data representing the claims as input. Here, the output data includes data representing a claim number referenced by the dependent claim. If the determination is unclear when the claim is classified, the claim can be classified as the independent claim.

Classification between the independent claim and the dependent claim may be determined using the degree of certainty (which is also referred to as confidence, reliability, or probability) that the claim is the independent claim and the degree of certainty that the claim is the dependent claim. In this case, the algorithm defined in the learned model 17 outputs these degrees of certainty. The analyzing unit 13 classifies, when the degree of certainty that a claim is the independent claim is greater than or equal to a predetermined value, the claim into the independent claim. Additionally, the analyzing unit 13 classifies, when the degree of certainty that a claim is the dependent claim is greater than or equal to a predetermined value, the claim into the dependent claim. Additionally, the analyzing unit 13 classifies a claim that does not fall under either the independent claim or the dependent claim (that is, a claim having the degree of certainty of the independent claim that is less than the predetermined value and the degree of certainty of the dependent claim that is less than the predetermined value) into the independent claim.

In each claim, this can prevent a user from skipping the reading of the independent claim by classifying the claims into the independent claim, from the viewpoint of fail-safe, when the determination is unclear or the degree of certainty that is output is low.

Here, the analyzing unit 13 may perform rule-based preprocessing before applying the algorithm indicated in the learned model 17 to the collection data in order to increase the degree of certainty of the various analyses described above.

For example, the analyzing unit 13 may extract text that serves as an index for division of each claim from the description of the claims included in each patent document. Specifically, the analyzing unit 13 may extract text representing each claim number, text immediately before a punctuation mark, or text such as "characterized by".

Here, depending on a form of the patent document, a form in which the expression "Claim" is not included in the description of the claims can be considered. However, because the description of the claims is considered to include text indicating at least each claim number, it is desirable that the analyzing unit 13 extracts text serving as an index for partitioning each claim based on the regularity of the text before and after each claim number.

Additionally, in order to increase the specification accuracy of the constituent components, the analyzing unit 13 may extract text such as "said" or "the" as text representing antecedent basis from the description of the claims included in each patent document. In this case, a word following the extracted character string becomes a candidate for the text indicating the constituent component.

Preferably, the analyzing unit 13 may perform a process having a content different for each language used in the description of the patent document as the preprocess thereof. Additionally, the analyzing unit 13 may perform analysis by using the learned model 17 having the content different for each language used in the description of the patent document. More preferably, the analyzing unit 13 may perform a preprocess having the content different for each destination of the application (a specific country or an international application) or may perform analysis by using the learned model 17 having the content different for each destination of the application. This allows the analyzing unit 13 to perform analysis according to characteristics in the language or according to characteristics in the destination of the application.

Specifically, the analyzing unit 13 determines the language that is used from the description of each patent document. As indicated in Table 1, the analyzing unit 13 extracts texts for each language to perform a process corresponding to the above-described case.

| No | JAPANESE | ENGLISH | CHINESE |
|---|---|---|---|
| 1 | | [the], [said] | |
| 2 | | [including], [comprising] | |
| 3 | | [step comprising], [step for . . . ing] | |
| 4 | | [wherein], [whereby], [thereof] | |
| 5 | | [characterized in], [characterized by], [characteristic is] | |
| 6 | | [more], [less], [than], [to] | |
| 7 | | [further], [according to] | |

The analyzing unit 13 may extract a text such as "comprising" or "including" as a text indicating a structure, and may further extract a text such as "steps comprising," or "steps for . . . ing" as a text indicating a structure of the process.

The analyzing unit 13 may extract a text such as "wherein", "whereby", or "thereof" as a text indicating a relationship between a cause and a result.

Additionally, the analyzing unit 13 may extract a text such as "characterized in", "characterized by", or the like as a text for specifying a preamble among the constituent components.

The analyzing unit 13 may extract a text such as "more", "less", "than", or "to" as a text for specifying a described content as a numerical range.

Additionally, the analyzing unit 13 may extract a text such as "further" or "according to" used in the dependent claim in order to improve the accuracy of the classification of each claim into the independent claim or the dependent claim.

Further, the analyzing unit 13 may perform morphological analysis as a preprocess. For example, the analyzing unit 13 partitions the description of each claim into morphemes, selects a candidate text representing the constituent component from the partitioned morphemes, and counts the number of the selected candidate texts included in each claim or in the description of the claims.

The analyzing unit 13 inputs a result of the preprocess thereof into the learned model 17 together with the text of each patent document included in the collection data to obtain an analysis result output from the learned model 17.

For example, if the analyzing unit 13 determines that the patent document is in English or Chinese, the analyzing unit 13 may extract the English or Chinese text indicated in Table 1.

Additionally, the collection data may also include text indicating the destination of the application for each patent document. For example, the text indicating each patent document include a text such as "US" indicating the United States of America, "EP" indicating Europe, and "PCT" indicating an international application. Therefore, the analyzing unit 13 may extract the text representing the destination of the application from the text representing each patent document and perform a different preprocess for each destination of the application or an analysis using the learned model 17 having a different content for each destination of the application.

Additionally, the learned model 17 may also include multiple models different for each analysis. For example, the analyzing unit 13 may achieve the identification of the constituent components, the determination of the text indicating the subject matter of the invention, and the classification of each claim into the independent or the dependent claim, by using separate models.

The display control unit 14 causes the display device 105 or the terminal device 30 to display various screens described below based on the analysis result of the analyzing unit 13 to assist the reading comprehension of the patent document.

The evaluation registering unit 15 registers a result of evaluating the patent document in accordance with the operation of the user that is received by the operation receiving unit 16. The registered evaluation contents are displayed on the screen of the display device 105 or the terminal device 30 by the display control unit 14.

The operation receiving unit 16 receives the operation of the user from the input device 104 or the terminal device 30. Specifically, the operation receiving unit 16 receives an input to various input devices such as a keyboard, a mouse, a touch panel, or the like provided with the input device 104 or the terminal device 30.

Next, an operation of the information processing device 10 will be described.

Figure 4:
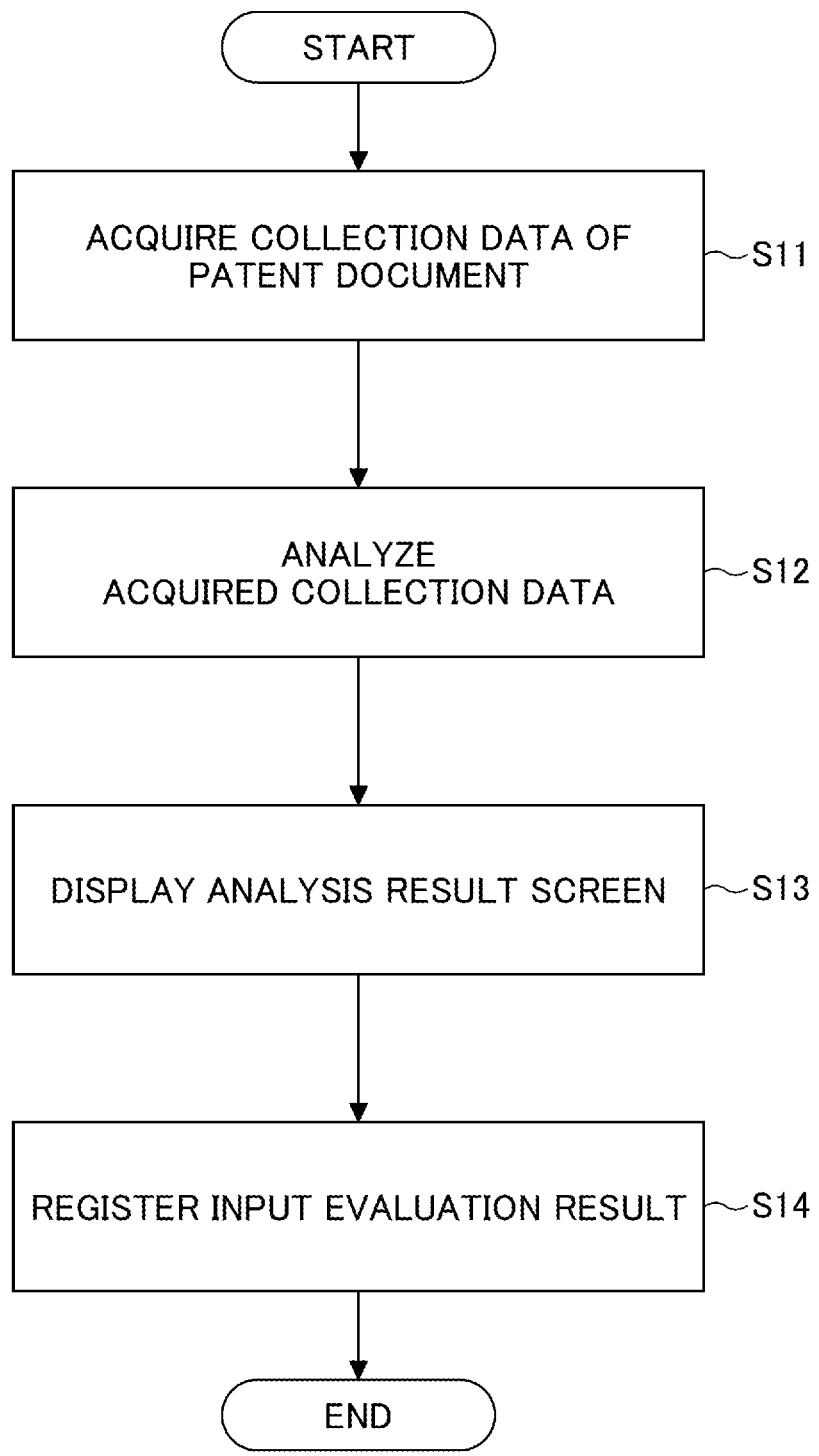
FIG. 4 is a flowchart illustrating an example of a reading comprehension support process of the information processing device according to one embodiment.

FIG. 4 is a flowchart illustrating an example of a reading comprehension support process of the information processing device according to one embodiment.

The patent document extracting device 20 transmits a signal requesting the start of the reading comprehension support process to the information processing device 10 in response to the operation of the user. The information processing device 10 starts the reading comprehension support process in response to the request signal transmitted from the patent document extracting device 20. The patent document acquiring unit 12 acquires the collection data of the patent documents (step S11).

Specifically, the patent document extracting device 20 searches for patent documents from the database of the patent documents upon receiving the specification of the search condition. The patent document extracting device 20 transmits, to the information processing device 10, one or more searched patent documents as one collection data. The collection data that is transmitted is, for example, data in a CSV format.

Next, the analyzing unit 13 analyzes the collection data that is received and acquired (step S12). Specifically, the analyzing unit 13 analyzes the collection data of the patent documents according to the algorithm defined in the learned model 17 and outputs the analysis result of each patent document.

The output analysis result includes text data obtained by partitioning the description of each claim into the constituent components having a length for easy reading comprehension, text data representing the subject matter of the invention of each claim, and data in which each claim is classified into the independent claim and the dependent claim.

Next, the display control unit 14 causes the display device 105 or the terminal device 30 to display the analysis result screen in accordance with the operation of the user that is received by the operation receiving unit 16 (step S13). The analysis result screen to be displayed is a screen for assisting the reading comprehension of the patent document. Specific details of the displayed content will be described later.

Next, the evaluation registering unit 15 registers the evaluation result input by the user (step S14). Specifically, the operation receiving unit 16 acquires information representing the evaluation result that is input to the evaluation input field included in the analysis result screen by receiving the operation of the user. The evaluation registering unit 15 stores the information representing the evaluation result acquired by the operation receiving unit 16 in the storage unit 11.

Here, the stored information representing the evaluation result is associated with the patent document. When the patent document is displayed, the display control unit 14 displays the analysis result screen including the evaluation result associated with the patent document. Additionally, the information processing device 10 may transmit, to the patent document extracting device 20, the registered information representing the evaluation result.

Next, the screen displayed by the display control unit 14 on the display device 105 or the terminal device 30 will be described.

The display control unit 14 of the information processing device 10 causes the display device 105 or the terminal device 30 to display a collection list screen in accordance with the operation of the user that is received by the operation receiving unit 16. The collection list screen includes a list of the collection data of the patent documents acquired by the patent document acquiring unit 12 in step S11 of the above-described reading comprehension support process.

A display field for each of collection data includes, for example, a panel header, a panel list, and a note field.

In the panel header, for example, the name of an analysis project for the collection data is displayed.

In the panel list, for example, attributes of the collection data, such as the title of the collection data, the number of publications included in the collection data, the creation date or most recent modification date, an author or a person who mostly recently modified the data, and the like, are displayed in a list format.

Additionally, the memo field includes, for example, a graphical user interface (GUI) of a button for performing a pop-up display of a memo editing screen for receiving an input of a text for a memo to be assigned to the collection data, and a display field for displaying the input text for the memo.

The display control unit 14 of the information processing device 10 causes the display device 105 or the terminal device 30 to display a publication list screen in accordance with the operation of the user that is received by the operation receiving unit 16.

The publication list screen includes, for example, a list of publications included in the collection data selected on the collection list screen. Additionally, the publication list screen includes a publication selection area and an analysis button.

The list of the publications includes, for example, item numbers, flags, publication numbers, titles, applicants, evaluations, statuses, and the objects of the inventions, as items.

The value of the item "item number" is a number of the publication in the collection data.

In the value of the item "flag", a flag set in the analysis result screen described below is displayed. The flag is used to record, for example, that the publication is noteworthy to the user.

The value of the item "publication number" is a publication number used when each patent document, such as the patent publication or the patent application publication, is published.

The value of the item "title" is the title of the invention of each patent document.

The value of the item "applicant" is the name of the applicant of each patent document.

The value of item "evaluation" is the evaluation result registered on the analysis result screen described below.

The value of the item "status" is the examination status of each patent document and the like.

The value of the item "the object of the invention" is a text indicating the subject matter of the invention determined by the analyzing unit 13 analyzing each patent document.

The publication selection area is a check box for selecting the publication. When the patent document is selected in the publication selection area and the analysis button is pressed by the user, the display control unit 14 causes the display device 105 or the terminal device 30 to display the analysis result screen indicating the analysis result of the selected patent document in accordance with the operation of the user that is received by the operation receiving unit 16.

The display of the collection list screen and the display of the list of the publications may also be displayed on multiple display devices 105 or terminal devices 30 used by other users authorized to share information. This allows the evaluation results input at the evaluation registering unit 15 to be shared and managed by a team of specific users. Additionally, by the team managing the collection of the patent documents, the reading of patent documents can be divided and proceeded by the team, thereby reducing the burden per user.

FIG. 5 is a diagram illustrating an example of the analysis result screen according to one embodiment.

The analysis result screen includes a header 1021, a navigation display field 1022, a claim display field 1023, an evaluation registration field 1024, a body text display field 1025, and a drawing display field 1026.

The header 1021 includes the name of the collection data, a link to the publication list screen, and the like. Additionally, the header 1021 includes the applicant, the title of the invention, a status display 1031, an icon center 1032, and the like for the patent document being selected. The icon center 1032 includes, for example, buttons for displaying icons and accepting operations, such as family presence/absence display, a detail display button, a flag button, a full-text display button, a portable document format (PDF) button, a CSV output button, a print output button, and the like.

The status display 1031 displays, by color, whether the patent right of the patent document being selected is in force. For example, if the patent right is in force, the status display 1031 is green to indicate that the patent right is in force, and if the patent right has expired, the status display 1031 is yellow to indicate that the patent right is no longer in force.

Specifically, the display control unit 14 determines whether the patent right is in force based on the filing date of the patent document or the like and determines the color of the status display 1031 based on the determined result.

In the family presence/absence display, it may be indicated by color whether what is called the patent family exists in the patent document being selected.

For example, if the patent family exists in the patent document, the family presence/absence display is red to indicate the presence of the patent family, and if no patent family exists, the family presence/absence display is gray to indicate the absence of the patent family.

Specifically, data indicating the presence or absence of the patent family is included in each patent document of the collection data acquired by the patent document extracting device 20, and the display control unit 14 determines the color of the family presence/absence display based on the data indicating the presence or absence of the patent family included in the collection data.

The detail display button is, for example, a GUI for pop-up display of the screen displaying the details of the patent family. Data indicating the details of the patent family may also be included in each patent document of the collection data acquired by the patent document extracting device 20.

The flag button is, for example, a GUI for receiving an operation to set the flag in the patent document being selected. When the flag is set, the set flag is displayed in the publication list screen described above and the navigation display field described below.

The full-text display button is a GUI for displaying a pop-up screen including the description of specification, claims, drawings, abstract, and the like included in the patent document being selected.

The PDF button is a GUI for generating and downloading a PDF file including the description of specification, claims, drawings, abstract, and the like included in the patent document being selected.

The CSV output button is a GUI for outputting the text displayed in the claim display field 1023 as a file in a CSV format according to the display format. By obtaining the description of each claim partitioned into the constituent components as a file in a CSV format, the file in the CSV format can be used for detailed analysis, such as for claim chart analysis.

The print output button is a GUI for printing the currently displayed claim display field 1023.

The navigation display field 1022 includes the list of the publications selected on the publication list screen, and is a display field for receiving the operation of selecting a patent document to be displayed in the header 1021, the claim display field 1023, the body text display field 1025, the drawing display field 1026, and the like.

The claim display field 1023 is a display field for the reading of the description of the claims based on the analysis result of the analyzing unit 13 with respect to the patent document being selected.

The claim display field 1023 includes an all claims button 1033, an independent claims button 1034, a division display format switching button 1038, a collapsing symbol 1039, a claim number display field 1040, and a constituent component display field 1041.

Additionally, the all claims button 1033 and the independent claims button 1034 are GUIs for respectively displaying the number of all claims and the number of independent claims and selecting a display object to be displayed among two display objects of "all claims" and "independent claims". When the display object is "all claims", all claims including independent claims and dependent claims are displayed, and when the display object is "independent claims", only independent claims are displayed.

The division display format switching button 1038 is a GUI for switching, each time the button is pressed, between three division display formats, namely, "expansion of all claims", "non-display of all claims", and "only independent claims" in this order, to select a format of displaying multiple constituent components partitioned from the description of the claims. The selected division display format is displayed next to the division display format switching button 1038.

When the division display format is "expansion of all claims", the constituent components of all claims selected as the display object are displayed. When the division display format is "non-display of all claims", the constituent components of all claims selected as the display object are not displayed. When the division display format is "only independent claims", the constituent components of only the independent claims among the claims selected as the display object are displayed.

Here, FIG. 5 is an example of a screen on which "all claims" are selected as the display object and "expansion of all claims" is selected as the division display format, and FIG. 6, which will be described below, is another example thereof. Additionally, FIG. 7, which will be described below, is an example of a screen on which "all claims" is selected as the display object and "only independent claims" is selected as the division display format, and FIG. 8 is an example of a screen on which "all claims" is selected as the display object and "non-display of all claims" as the division display format.

The collapsing symbol 1039 is a symbol indicating whether the constituent components of the claim are displayed. Here, as illustrated in FIG. 5, when the division display format is "expansion of all claims", the constituent components are displayed for all the claims selected as the display object, the collapsing symbol 1039 is a downward arrow indicating that the constituent components are displayed.

The claim number display field 1040 includes a claim number, a text indicating the subject matter of the invention of the claim, and, in the case of the dependent claim, a claim number of a claim to which the claim refers.

The text indicating the subject matter of each claim, the claim number of the claim to which the dependent claim refers and the like are included in the analysis result of the analyzing unit 13. The display control unit 14 corresponds the text indicating the subject matter to the claim number based on the analysis result and causes the display device 105 or the terminal device 30 to display the text.

In the claim number display field 1040, for example, a background color indicating the independent claim is different from a background color indicating the dependent claim, so that the independent claim and the dependent claim can be distinguished at a glance.

In the constituent component display field 1041, the texts indicating the claims are arrayed and displayed in different display fields for respective constituent components. The text indicating each constituent component is a text having a length for easy reading comprehension that is partitioned by the analyzing unit 13 according to the algorithm defined in the learned model 17.

The display of the claim display field 1023 when the display object is "all claims" and the division format is "expansion of all claims" allows the user to quickly and accurately read the description of each claim while comprehensively checking the description of all the claims included in the claims.

The display control unit 14 partitions the text indicating each claim in the claims into the constituent components and causes the display device 105 or the terminal device 30 to display the partitioned text. By the user reading the text partitioned into each constituent component, the time for searching for the constituent component separator is shortened and the reading speed is improved. Additionally, the accuracy of the reading comprehension is improved because the number of mistakes in the partitioning of the constituent component is reduced.

Evaluation result options are displayed in the evaluation registration field 1024. The options to be preferentially displayed among predetermined options can be set for each user. When a link "Display evaluation input" included in the evaluation registration field 1024 is selected, the display control unit 14 causes the display device 105 or the terminal device 30 to display an evaluation input screen. The evaluation input screen will be described below.

If the evaluation result of the user with respect to the patent document being selected is already registered, the registered evaluation result is displayed in the evaluation registration field 1024.

A link "Display body text" is displayed in the body text display field 1025. When the link "Display body text" is selected, the display control unit 14 causes the display device 105 or the terminal device 30 to display the text described in the description of the patent document being selected.

A representative drawing and respective drawings of the patent document being selected are displayed in the drawing display field 1026. In addition to the figures in the drawings, a table indicated as "Table 1" and the like, a chemical formula, a calculation formula, and the like indicated as "Formula 1" and the like, a chemical structure diagram indicated by "Structural Formula 1", or the like, in the specification may be displayed in the drawing display field 1026.

Figure 6:
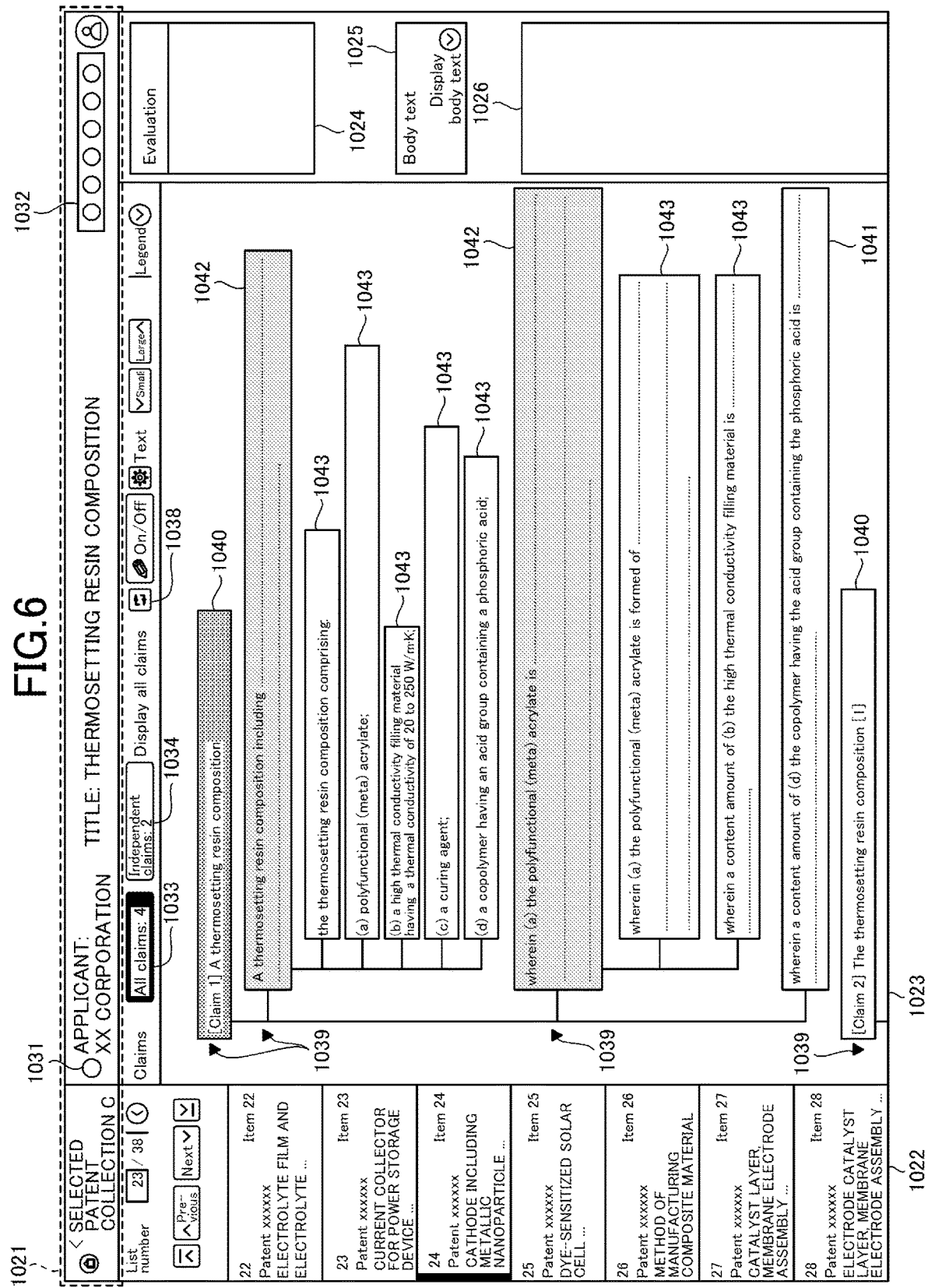
FIG. 6 is a view illustrating another example of the analysis result screen according to one embodiment.

FIG. 6 is a diagram illustrating another example of the analysis result screen according to one embodiment.

In the claim display field 1023, as illustrated in FIG. 6, the text indicating each claim may be further partitioned into multiple levels and displayed. Specifically, in the claim display field 1023, a text obtained by partitioning the text indicating each claim is displayed as a constituent component display field (an upper layer) 1042, and a text obtained by further partitioning the text displayed in the constituent component display field (the upper layer) 1042 is displayed as the constituent component display field (a lower layer) 1043.

The constituent component display field (the upper layer) 1042 and the constituent component display field (the lower layer) 1043 are displayed linked with each other. The constituent component display field (the lower layer) 1043 is positioned downward in the screen from the constituent component display field (the upper layer) 1042, which is an upper layer thereof.

Here, in FIG. 6, an example of a hierarchical representation having two or less layers is illustrated. However, a hierarchical representation having three or more layers may be included.

Additionally, by reading only the constituent component display field 1041, which is not hierarchized, and the constituent component display field (the lower layer) 1043, which is the lowest layer, all the text indicating each claim can be read without any overlapping. Therefore, the constituent component display field (the upper layer) 1042, which is a layer other than the lowest layer, is a less prominent display than the constituent component display field 1041, which is not hierarchized, and the constituent component display field (the lower layer) 1043, which is the lowest layer.

By displaying the text indicating each claim in multiple layers, even when the text indicating each claim includes the description of the constituent components that have a structure of a complex sentence or a long sentence, which is complicated, a text structure is easily understood, which leads to quick and accurate reading comprehension.

Here, the claim display field 1023 is displayed schematically as a structural drawing. For example, the claim number display field 1040 is linked with the constituent component display field 1041, the constituent component display field (the upper layer) 1042, or the constituent component display field (the lower layer) 1043 with a line. That is, the relationship between the constituent components is represented schematically in the claim display field 1023 as the structural drawing.

The constituent component display field 1041 forms part of the structural drawing by being enclosed in a frame to indicate the constituent component as one block.

Additionally, the schematized representation as the structural drawing visualizes the complex text structure of the text indicating each claim. By using the schematized representation as the structural drawing and the visualization, it can be quickly recognized that the constituent components are in the same layer in the case of one layer and the text representing the claim has a complicated hierarchical relationship in the case of more than one layer, for example.

Figure 7:
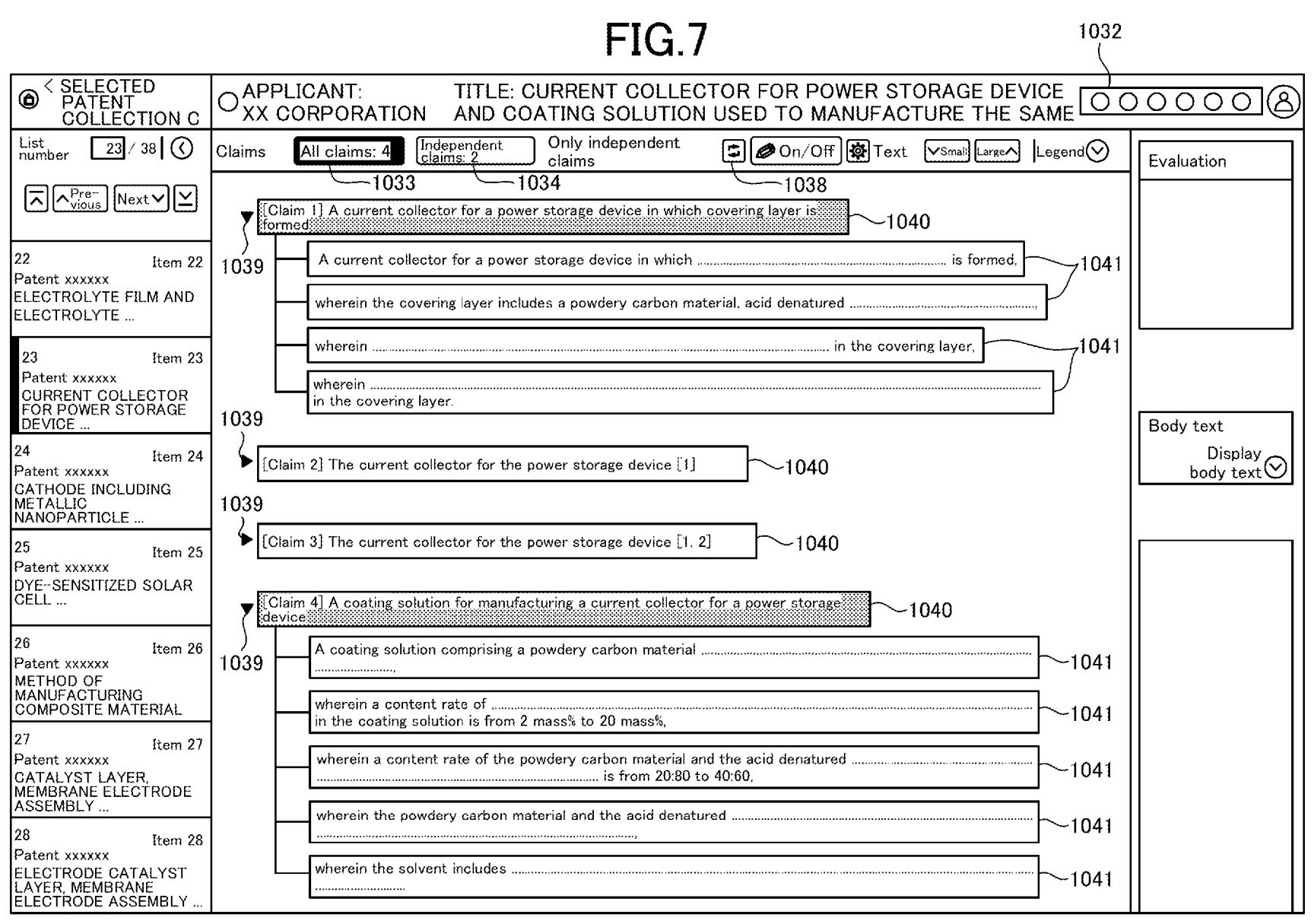

FIG. 7 is a diagram illustrating yet another example of the analysis result screen according to one embodiment.

FIG. 7 is an example of a screen in which all claims button 1033 is pressed to select "all claims" as the display object, and the division display format switching button 1038 is pressed to select "only independent claims" as the division display format, on the analysis result screen illustrated in FIG. 5.

In this division display format, in the case of the independent claim, the claim number display field 1040 and the constituent component display field 1041 are displayed. In the case of the dependent claim, only claim number display field 1040 is displayed, and the constituent component display field 1041 is not displayed.

The collapsing symbol 1039 displayed next to the claim number display field 1040 of the independent claim becomes a downward arrow indicating that the constituent component is displayed. The collapsing symbol 1039 displayed next to the claim number display field 1040 of the dependent claim becomes a rightward arrow indicating that the constituent component is not displayed.

When the division display format is "only independent claims", with respect to the patent right in the patent documents being selected, only the independent claim directly related to the scope of the right is collapsed into the constituent components and displayed, and the description of the dependent claim, which is not directly related to the scope of the right, is not displayed. Therefore, only the necessary information is displayed on the screen, so that the user can efficiently read the displayed constituent components, thereby allowing the user to grasp the scope of the patent right quickly and accurately.

FIG. 8 is a diagram illustrating yet another example of the analysis result screen according to one embodiment.

FIG. 8 is an example of a screen on which the all claims button 1033 is pressed to select "all claims" as the display object and the division display format switching button 1038 is pressed to select "non-display of all claims" as the division display format, on the analysis result screen shown in FIG. 5.

In this division display format, for all claims, only the claim number display field 1040 is displayed, and the constituent component display field 1041 is not displayed.

The collapsing symbol 1039 displayed next to the claim number display field 1040 of each claim becomes a rightward arrow indicating that the constituent component is not displayed.

When the division display format is "non-display of all claims", the content of each claim is not displayed, and more texts indicating the subject matter of the invention of the claims are displayed on the screen, and the independent claim and the dependent claim are distinguishable at a glance. Therefore, the user can grasp the overall structure of the claims at a glance. Additionally, because only the texts indicating the subject matters of the invention of the claims are displayed, if the patent document does not need to be read, the user can quickly skip the patent document.

Additionally, by looking at the text indicating the subject matter of the invention, it can be quickly determined whether the claim needs to be read in detail before reading the description of the claim, thereby increasing the speed in comprehending the patent document as a whole.

Although not illustrated, when the independent claims button 1034 is pressed to select "independent claims" as the display object and the division display format switching button 1038 is pressed to select "non-display of all claims" as the division display format, on the analysis result screen illustrated in FIG. 5, only the claim number display field 1040 is displayed and the constituent component display field 1041 is not displayed for the independent claim, and neither the claim number display field 1040 nor the constituent component display field 1041 is displayed for the dependent claim, in the patent document being selected.

The evaluation input screen may be a pop-up dialog displayed when the link "Display evaluation input" in the evaluation registration field 1024 on the analysis result screen of FIG. 5, 6, 7, or 8 is selected.

The evaluation input screen may include an evaluation selection button, a category selection pull-down menu, a text input field, and a registration button.

The evaluation selection button is, for example, a GUI for selection among options set to be displayed preferentially for each user among predetermined options.

In addition to the evaluation selection button, the evaluation selection pull-down menu may be provided on the evaluation input screen. The evaluation selection pull-down menu is a GUI for selecting an evaluation result from options other than the options set to be displayed preferentially for each user among predetermined options.

The category selection pull-down menu is, for example, a GUI for selecting an evaluation category from options set in the patent document extracting device 20.

The text input field is an input field for inputting text, such as notes, comments, and the like.

The registration button is, for example, a GUI for registering selected and input information. When the registration button is pressed, the evaluation registering unit 15 stores the selected and input information in the storage unit 11 in association with the patent document being selected and transmits the selected and input information to the patent document extracting device 20.

This allows the user to record results of reading and evaluating the patent documents, to use the results of the evaluation by himself/herself, and to inform the results of the evaluation to other users to have them use the results.

Here, although an example in which the evaluation result is associated with the patent document has been described, the evaluation registering unit 15 may register the evaluation result evaluated for each claim or for each constituent component.

According to the reading comprehension support system 1 according to the present embodiment, the contents of the patent document can be read and comprehended quickly and accurately because the information necessary for reading comprehension is arranged on the analysis result screen.

Conventionally, when reading and comprehending the description of the claim included in the claims, it is necessary for a person in charge or the like to partition the description of the claim into the constituent components and examine each constituent component.

However, as illustrated in FIG. 5, FIG. 6, or FIG. 7, the analyzing unit 13 perform analysis using the learned model 17 and the display control unit 14 causes the description of the claim to be displayed for each partitioned constituent component, thereby reducing the workload of a task of partitioning the claim into the constituent components and avoiding risk of misunderstanding due to the inappropriate partition of the claim into the constituent components.

Additionally, as illustrated in FIG. 7, only the independent claim is collapsed into the constituent components and the constituent components are displayed, and thus only the necessary information is displayed on the screen, so that the user can read the information efficiently while avoiding risk of skipping the reading, when the reading comprehension with attention to the scope of the right is desired, for example.

Further, as illustrated in FIG. 8, the texts indicating the subject matters of respective claims are listed, so that the user can grasp the entire structure of the claims at a glance.

According to the reading comprehension support system 1 according to the present embodiment, the number of the retrieval processes in which the patent document extracting device 20 receives a request from a user is reduced by improving the accuracy of the user in reading and comprehending the patent document, and the load of the process of the patent document extracting device 20 is suppressed.

Additionally, the accuracy of the search task of the patent documents is improved, so that the use of patented invention is promoted in the product development and the like, thereby reducing the risk of patent infringement.

The present invention is not limited to the embodiments specifically disclosed, and various modifications and alterations can be made without departing from the scope of the claims.

In the present embodiment, an example, in which data representing the patent documents included in the collection data is data described in the bulletin such as the patent publication and the patent application publication. However, the data representing the patent documents is not limited to the data described in the bulletin. The data representing the patent documents is not required to include data representing the specification, drawings, abstract, and the like, and may be what is called draft claims, as long as the data representing the patent documents indicates the claims and includes the text data described in each claim.

The text indicating the subject matter of the invention in the present embodiment is a text indicating the object of the invention. More specifically, as the text indicating the subject matter of the invention, a phrase that unambiguously indicates the invention and that has a length in which the user can easily identify the invention is selected from the text of each claim. The text indicating the subject matter of the invention may be the same as the title of the invention, or in the case of Japanese or the like, the text indicating the subject matter of the invention may be a phrase the same as the text at the end of each claim, or may be a phrase that is different from these descriptions. For example, not only the text at the end of each claim, such as "a current collector for a power storage device", but also the text indicating the specific feature of the invention that can be distinguished from other inventions in the technical field, such as "a current collector for a power storage devices in which a covering layer is formed".

If the user can roughly understand the content of the invention simply by looking at the text indicating the subject matter of the invention, the user can quickly determine whether the claim needs to be read in detail before reading the description of the claim.

The display control unit 14 may be controlled to highlight an important word, a new word, and the like of the claim in the constituent component display field 1041 illustrated in FIG. 5, FIG. 6, or FIG. 7.

The important word is used in the claims as an important word relevant to the essential part of the invention and is described in detail later. For example, the important word may be extracted by using a condition that the word is repeatedly described in the claims.

The new word is a term without antecedent description in the claims and is used to describe the invention in the specification. The new word may overlap with the important word or may be limited to terms other than technical terms, general terms, or jargon.

In this case, the analyzing unit 13 extracts the new word and the important word in the claims based on the description of the specification and the claims, and the display control unit 14 may perform control for displaying with a color different from other character colors based on the analysis result, such that the new word is displayed in blue and the important word is displayed in red in the constituent component display field 1041. By highlighting the new word, the important words, and the like in such a way, a point of interest can immediately found in the claims.

The information processing device 10 may reflect the description of the claim partitioned into the constituent components in table data in a form of spreadsheet software or the like and output the table data. The user can use the output data for source data of the search data and the like without change.

Although an example, in which the information processing device 10, the patent document extracting device 20, and the terminal device 30 according to the present embodiment are separate, has been described, some or all of the devices may be implemented by the same device.

The display device 105 and the terminal device 30 are examples of the display device that is controlled by the display control unit 14 to display the screen. The display device is not limited thereto. As long as the screen can be displayed, a projector, a monitor, or the like may be used.

In the present embodiment, an example in which the patent document and various display screens are in Japanese has been described, but other languages may be used. For example, in the case of an English language patent document, if the learned model 17 specialized in the English patent document is constructed, the reading comprehension support system 1 can be achieved by substantially the same mechanism as in the case of the Japanese language patent document.

The present international application is based on and claims priority to Japanese Patent Application 2019-230888, Japanese Patent Application 2019-230889, and Japanese Patent Application 2019-230890, filed on Dec. 20, 2019, the entire contents of which are hereby incorporated herein by reference.

DESCRIPTION OF THE REFERENCE NUMERALS 1 reading comprehension support system
10 information processing device
11 storage unit
12 patent document acquiring unit
13 analyzing unit
14 display control unit
15 evaluation registering unit
16 operation receiving unit
17 learned model
20 patent document extracting unit
30 terminal device
40 network
101 CPU
102 main storage device
103 auxiliary storage device 104 input device
105 display device
106 communication interface device
107 drive device
108 storage medium
1021 header
1022 navigation display field
1023 claim display field
1024 evaluation registration field
1025 text display field
1026 drawing display field
1031 status display
1032 icon center
1033 all claims button
1034 independent claim button
1038 division display format switching button
1039 collapsing symbol
1040 claim number display field
1041 constituent component display field
1042 constituent component display field (upper layer)
1043 constituent component display field (lower layer)

The invention claimed is:

1. An information processing device comprising:
a processor; and
a memory storing program instructions that cause the processor to:
analyze text data representing claims included in patent document data to identify constituent components of an invention for each claim included in the claims;
cause a display device to display texts indicating each claim in the claims, in a form in which the texts indicating each claim are partitioned into the constituent components,
wherein the processor inputs the text data representing the claims included in the patent document data, into a learned model constructed by machine learning, to acquire a text indicating subject matter of the invention for each claim included in the claims,
wherein the processor causes the display device to display the text indicating the subject matter in association with a number of the claim,
wherein the processor further identifies an important word in the text data representing the claims, the important word indicating an important term, and
wherein the processor causes the display device to highlight a text indicating the important word in the texts indicating each claim in the claims.

2. The information processing device as claimed in claim 1,
wherein the processor further analyzes text data representing a specification included in the patent document data to identify a new word indicating a term used to describe the invention in the specification, no antecedent description of the term being included in the claims, and
wherein the processor causes the display device to highlight a text indicating the new word in the texts indicating each claim in the claims.

3. The information processing device as claimed in claim 1,
wherein the processor receives an input of an evaluation result of a user with respect to the patent document data, and
registers the evaluation result in association with the patent document data,
wherein the processor causes the display device to display the evaluation result.

4. The information processing device as claimed in claim 3, wherein the processor causes devices used by a plurality of users to display the analyzed patent document data and the registered evaluation result.

5. The information processing device as claimed in claim 1, wherein the processor causes the partitioned constituent components to be schematically displayed as a structural drawing.

6. The information processing device as claimed in claim 5, wherein the processor causes the display device to switch between displaying a screen that includes the texts indicating each claim of the claims and a screen that does not include the texts indicating each claim of the claims, in accordance with an operation of a user.

7. The information processing device as claimed in claim 6, wherein the processor selects the text indicating the subject matter in the text data representing the claim.

8. The information processing device as claimed in claim 6, wherein the processor selects a phrase that unambiguously indicates the invention and that has a length in which a user can easily identify the invention, in the text data representing the claim, as the text indicating the subject matter.

9. The information processing device as claimed in claim 1,
wherein the processor analyzes the text data representing the claims included in the patent document data to identify a dependent relationship of the claim included in the claims, and
wherein the processor causes a display device to display a text indicating an independent claim included in the claims based on the identified dependent relationship.

10. The information processing device as claimed in claim 6,
wherein the processor analyzes the text data representing the claims included in the patent document data to identify a dependent relationship of the claim included in the claims, and
wherein, based on the identified dependent relationship, the processor causes the display device to display the texts indicating each claim in the claims in the form in which the texts indicating each claim are partitioned into the constituent components with respect to an independent claim, and display the text indicating the subject matter in association with the number of the claim and display the texts indicating each claim in the claims in a selected division display format with respect to a dependent claim, a division display format in which the texts indicating each claim in the claims that are partitioned into the constituent components are displayed or a division display format in which the texts indicating each claim in the claims is not displayed is selected as the selected division display format.

11. The information processing device as claimed in claim 9, wherein the processor classifies a claim whose dependent relationship is unclear into an independent claim in a process of identifying the dependent relationship.

12. A reading assist method comprising:
analyzing text data representing claims included in patent document data to identify constituent components of an invention for each claim included in the claims;
displaying texts indicating each claim in the claims, in a form in which the texts indicating each claim are partitioned into the constituent components,
inputting the text data representing the claims included in the patent document data, into a learned model constructed by machine learning, to acquire a text indicating subject matter of the invention for each claim included in the claims, displaying the text indicating the subject matter in association with a number of the claim, identifying an important word in the text data representing the claims, the important word indicating an important term, and highlighting a text indicating the important word in the texts indicating each claim in the claims.

13. The reading assist method as claimed in claim 12, comprising:

analyzing the text data representing the claims included in the patent document data to identify a dependent relationship of the claim included in the claims, and displaying a text indicating an independent claim included in the claims based on the identified dependent relationship.

14. A non-transitory computer-readable storage medium having stored therein a program causing a computer to:

analyze text data representing claims included in patent document data to identify constituent components of an invention for each claim included in the claims;

cause a display device to display texts indicating each claim in the claims, in a form in which the texts indicating each claim are partitioned into the constituent components, input the text data representing the claims included in the patent document data, into a learned model constructed by machine learning, to acquire a text indicating subject matter of the invention for each claim included in the claims, display the text indicating the subject matter in association with a number of the claim, identify an important word in the text data representing the claims, the important word indicating an important term, and highlight a text indicating the important word in the texts indicating each claim in the claims.

15. The non-transitory computer-readable storage medium as claimed in claim 14, the program further causing the computer to perform:

analyzing the text data representing the claims included in the patent document data to identify a dependent relationship of the claim included in the claims, and causing the display device to display a text indicating an independent claim included in the claims based on the identified dependent relationship.

* * * * *